United States Patent [19]
Van De Vel

[11] Patent Number: 5,011,459
[45] Date of Patent: Apr. 30, 1991

[54] WHEEL SUSPENSION FOR A WHEEL DRIVEN BY AN ENDLESS TRANSMISSION

[76] Inventor: Alfons Van De Vel, Kretenborg 39, B - 2580 Sint-Katelijne-Waver, Belgium

[21] Appl. No.: 415,264

[22] PCT Filed: Jan. 6, 1989

[86] PCT No.: PCT/BE89/00002
§ 371 Date: Sep. 6, 1989
§ 102(e) Date: Sep. 6, 1989

[87] PCT Pub. No.: WO89/06203
PCT Pub. Date: Jul. 13, 1989

[30] Foreign Application Priority Data
Jan. 7, 1988 [DE] Fed. Rep. of Germany ....... 8800009

[51] Int. Cl.$^5$ .................... F16H 7/08; B62K 25/02
[52] U.S. Cl. .................... 474/101; 180/227; 280/284
[58] Field of Search ........ 474/101, 109, 111, 113–117, 474/133–138; 180/227; 280/284

[56] References Cited

U.S. PATENT DOCUMENTS

| | | | |
|---|---|---|---|
| 2,576,582 | 11/1951 | Elliott | 474/134 X |
| 4,058,181 | 11/1977 | Buell | 280/284 X |
| 4,299,582 | 11/1981 | Leitner | 474/109 |
| 4,408,674 | 10/1983 | Boyesen | 180/227 |
| 4,515,236 | 5/1985 | Kanamori | 280/284 X |

FOREIGN PATENT DOCUMENTS 0152260 8/1985 European Pat. Off. .
2419210 10/1979 France .

Primary Examiner—Thuy M. Bui
Attorney, Agent, or Firm—Foley & Lardner

[57] ABSTRACT

Wheel suspension for a wheel driven by an endless transmission, characterized in that the rocking point (11), apart from the driven wheel (2), of the rocking arms (9-10) are connected by levers (13-15), (28-29). With respect to a part of the vehicle of which the driven wheel is a part, these levers ensuring that during the rocking of the levers (9-10) aforementioned rocking point (11) is always located on an axis drawn through shafts (7-11-3) of the transmission (6-5-4), in which the distance between shafts 3 and 7 is constant or virtually constant.

12 Claims, 4 Drawing Sheets

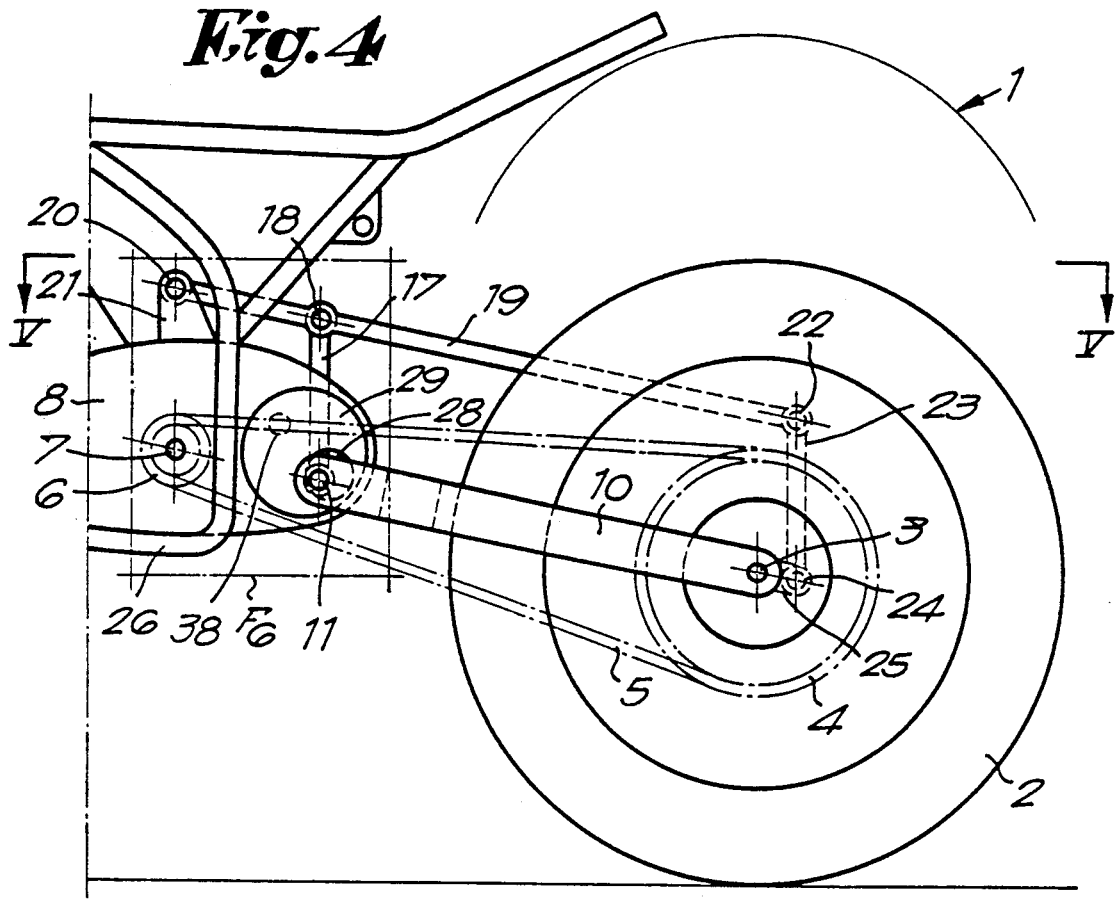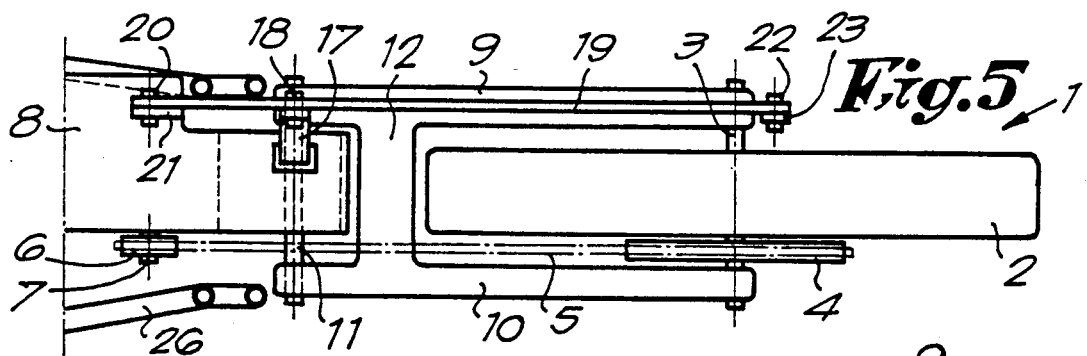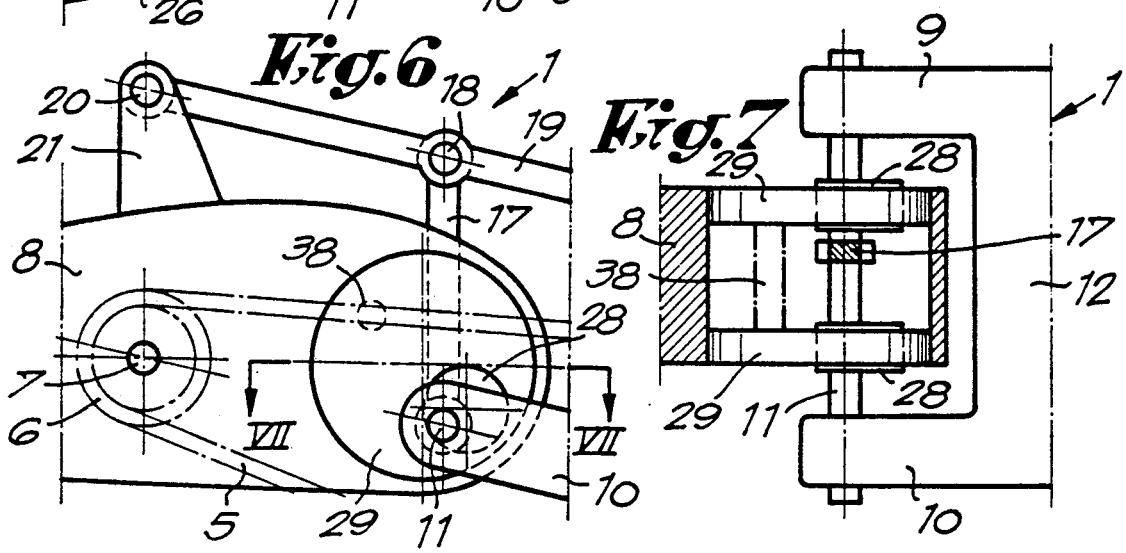

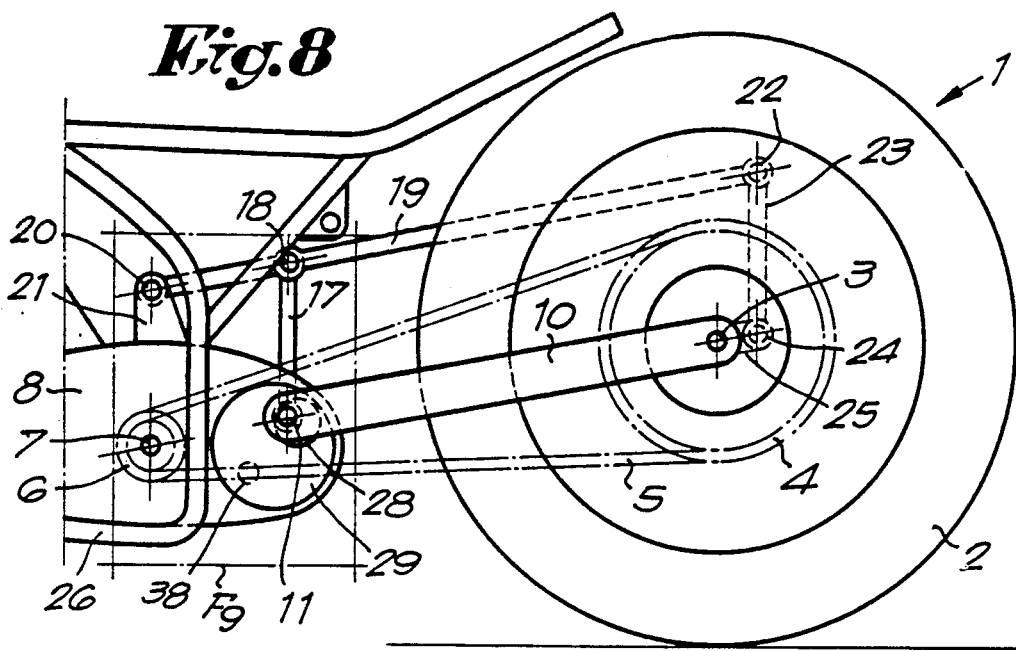
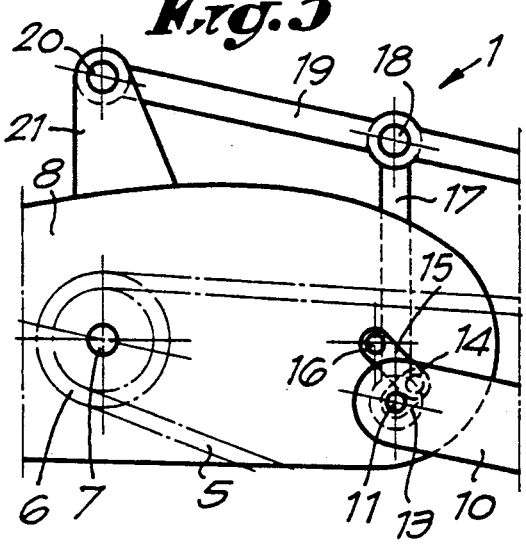
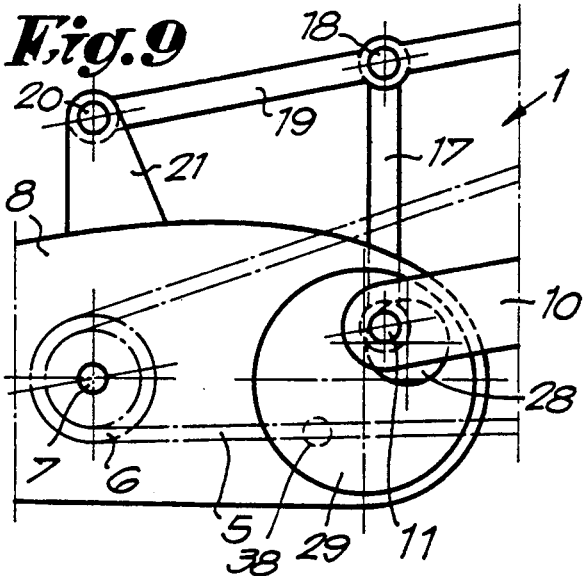
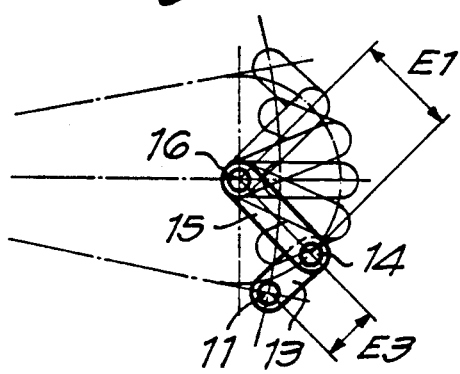
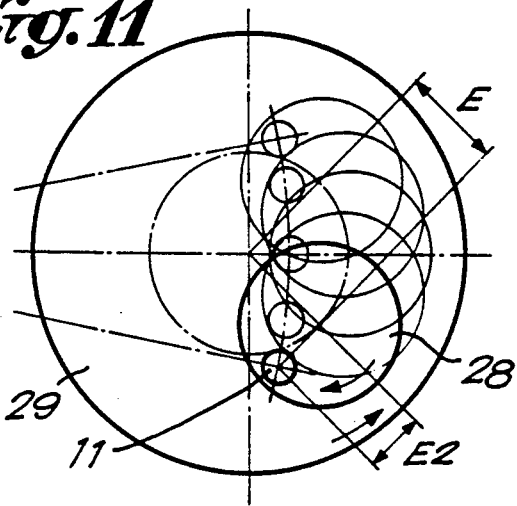

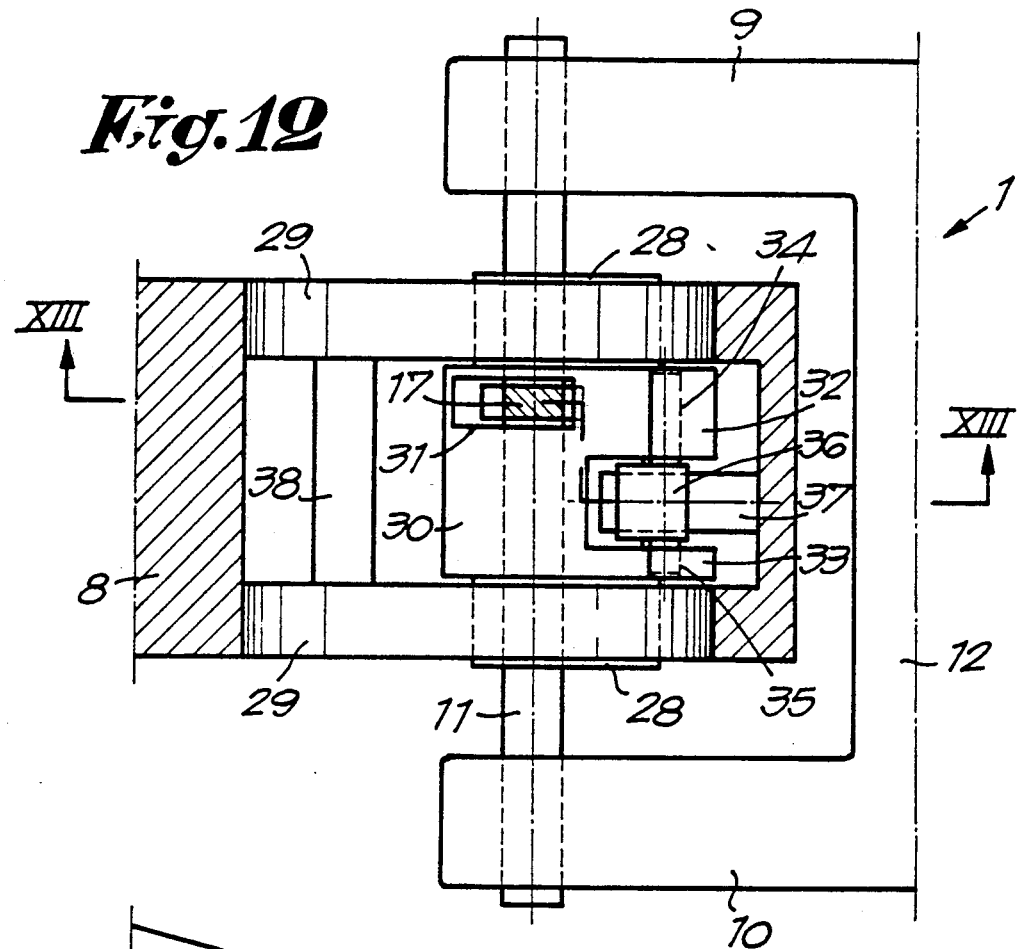

WHEEL SUSPENSION FOR A WHEEL DRIVEN BY AN ENDLESS TRANSMISSION

BACKGROUND OF THE INVENTION

1. Field of the Invention

Present invention concerns a wheel suspension for a wheel driven by an endless transmission of, for instance, a motorcycle, a trike, a quad, a snowmobile or similar, in which a wheel, more particularly a wheel driven by means of an endless transmission such as a chain, a belt or similar cooperates with sprocket wheels or pulleys, on the one hand, on a crankcase, frame, chassis or similar and, on the other hand, on aforementioned driven wheel.

2. Description of the Related Art

It is known that an aforementioned driven wheel is generally mounted on a rocking arm whose second extremity is hinged with respect to the frame, in which this hinged attachment usually is provided between aforementioned sprocket wheels or pulleys.

It is known, among others, that such an arrangement results, due to the rocking of the rocking arm, caused by irregularities in the road surface with which the driven wheel is in contact, in continuous variations in the tension of the endless transmission.

The variance in distance between the pivoting point of the sprocket wheel at the motor's end and the hinge point of the rocking arm at the motor's end together with continuous tension variations in the endless transmission during the rocking of the rocking arm result herewith in the fact that during acceleration or braking of the driven wheel an unwanted force is applied to the rocking arm which forces latter to spring in or spring out, depending on the acceleration or braking applied.

Present invention thus concerns a suspension in which one endeavours to keep aforementioned force as small as possible, respectively eliminate it, on the one hand, and to keep aforementioned tension as constant as possible, on the other hand.

A suspension according to the invention consists mainly in that the rocking point of the rocking arm distant from the driven wheel is connected with respect to the crankcase by means of levers, in which these levers provide, during the rocking of the levers, for aforementioned rocking point always to be located on a line drawn through the axles of the endless transmission, in which the distance between these axles always remains constant or nearly is constant.

An embodiment is known, as described in U.S. Pat. No. 4,058,181, in which a suspension is provided for the rear wheel of a motorcycle formed by a pure parallelogram system.

The disadvantage of such a system is that it is not only formed by a relatively high number of parts and pivoting points, but as well that the mass of the whole becomes quite substantial which is detrimental to the suspension's inertia.

In order to cope with the disadvantages related to such an embodiment according to U.S. Pat. Nos. 4,058,181, 4,408,674 suggests an embodiment which aims at reducing the inertia of the suspension.

The disadvantage of latter embodiment, though, is that the number of parts, on the one hand, and the number of pivoting points, on the other hand, increases substantially these pivoting points being quite difficult to protect against water, dirt, sand and similar in such way that said design is quite susceptible to wear and tear, especially considering that the use of it usually occurs in most adverse conditions.

Present invention thus concerns an embodiment in which a mechanism is applied which is developed with a minimum of pivoting points and a minimum of elements, this, in such way, that the rotating parts to which real forces are applied to can be protected against dirt and similar, on the one hand, and in which a design is applied which only serves the purpose of positioning aforementioned mechanism and which is preferably formed by a parallelogram, on the other hand.

SUMMARY OF THE INVENTION

The main advantages obtained with a suspension according to the invention are:
- a favourable distribution of forces during accelaration and braking;
- due to this, the possibility of good accelerations;
- no jerkey drive of the driven wheel;
- increased elasticity;
- a simple frame;
- the possibility of installing a brake on the output shaft of the crankcase instead of on the driven wheel.

BRIEF DESCRIPTION OF THE DRAWINGS

In order to better show the characteristics of the invention some preferential embodiments are described hereafter, as an example and without any restrictive character with reference to the enclosed drawings, in which:

FIG. 3 shows, at a larger scale, the part indicated by F3 in FIG. 2;

FIG. 4 shows a similar view to that in FIG. 2, but for a more practical embodiment;

FIG. 5 shows a view according to line V—V in FIG. 4;

FIG. 6 shows, on a larger scale, the part indicated by F6 in FIG. 4;

FIG. 7 shows a view according to line VII—VII in FIG. 6;

FIG. 8 shows a view similar to that of FIG. 4, but for a second position;

FIG. 9 shows, at a larger scale, the part indicated by F9 in FIG. 8;

FIG. 10 shows a schematic view of the movement of the point of suspension of the rocking arm from which the driven wheel is suspended, in a part rigidly affixed to the frame, for the embodiment according to FIG. 2;

FIG. 11 shows a schematic view of the movement of the point of suspension of the rocking arm from which the driven wheel is suspended, in a part rigidly affixed to the frame, for the embodiment according to FIG. 4;

FIG. 12 shows, at a larger scale, a further developed embodiment of FIG. 7;

FIG. 13 shows a cross section according to line XIII—XIII in FIG. 12.

DETAILED DESCRIPTION OF THE PREFERRED EMBODIMENTS

The following description will include, as an example of an endless transmission, the description of a so-called sprocket wheel transmission.

Figure 1:
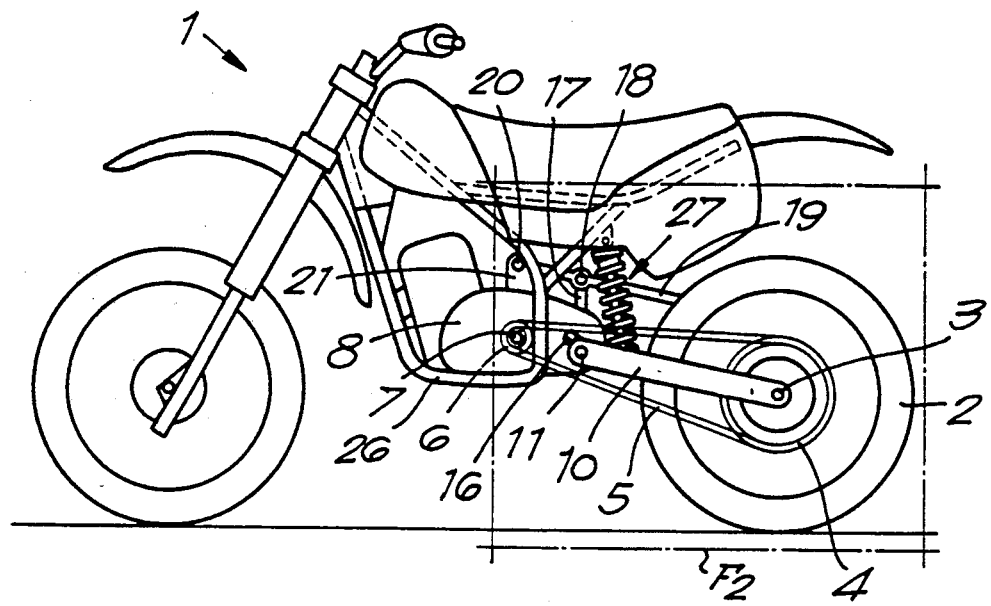
FIG. 1 shows a schematic side view of a motorcycle on which the rear wheel suspension is applied according to the invention.

In FIG. 1, a motor vehicle 1 is shown to which the driven wheel 2, according to the invention, is suspended.

A sprocket wheel 4, which by means of chain 5 cooperates continuously with a sprocket wheel 6 which is mounted on the output shaft 7 of the crankcase 8, is mounted to the driven wheel 2.

According to the invention the shaft 3 mounted in the rocking arms, respectively 9 and 10, which are hinged with their second extremity on a common shaft 11 which in turn is mounted on the crankcase 8.

Preferably, the rocking arms 9 and 10 are joint together by a bridge connection 12 (see FIG. 5) between the crankcase 8 and the driven wheel 2.

Figure 2:
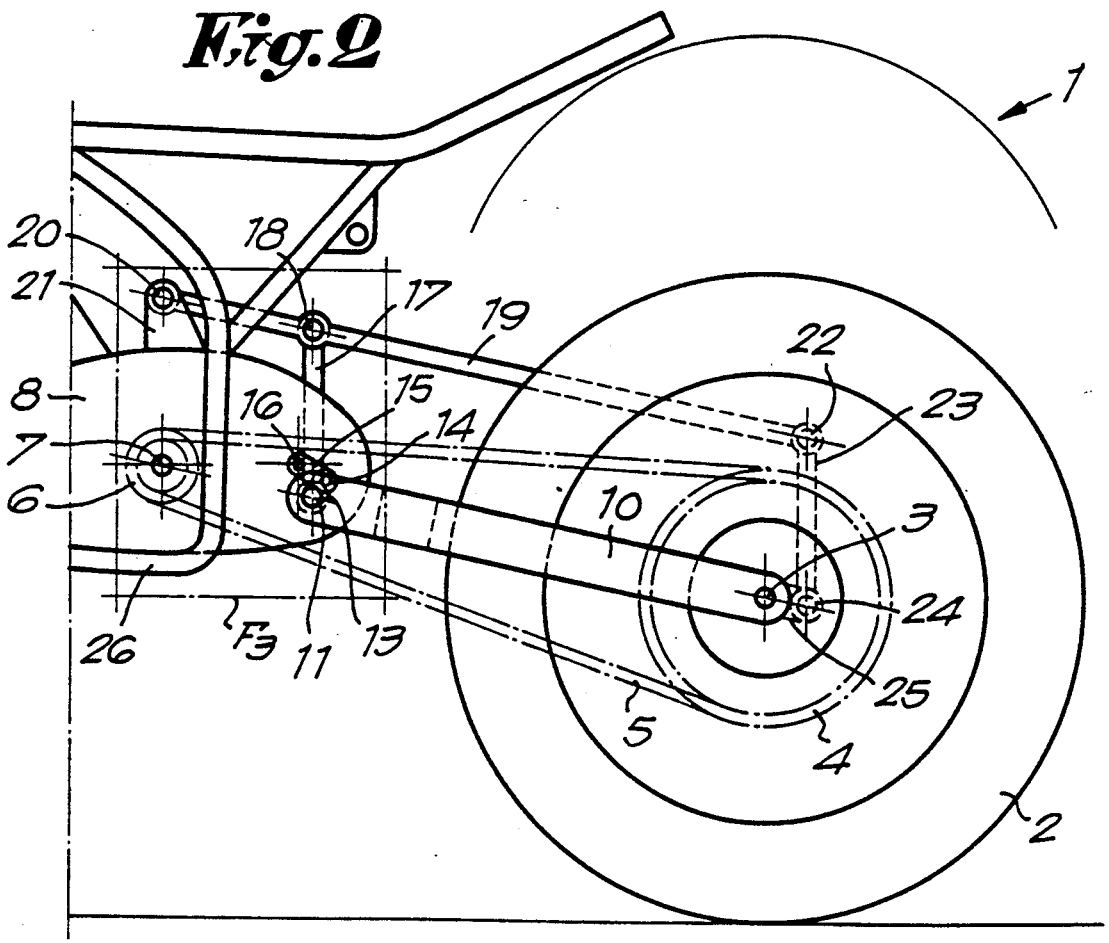
FIG. 2 shows, at a large scale, the part indicated in FIG. 1 by F2.

On at least one extremity of shaft 11, in the embodiment according to FIG. 2, a freely rotating lever 13 is mounted, whose free extremity is hinged freely, by means of a pivot 14, with a second lever 15 which is supported on bearings, by means of a pivot or shaft 16, in the crankcase 8 on an appropriate location.

On shaft 11, furthermore, a rod 17 is installed, freely rotating, on whose second extremity, by means of a freely rotating shaft 18, is linked a rod 19 which, at one extremity, is connected by means of a pivot 20 and a support 21, in this case, with the crankcase 8 and whose second extremity, by means of a pivot 22 is connected, freely rotating, with a rod 23 whose second extremity, by means of a pivot 24, is connected with an extension 25 of, in this case, the rocking arm 9.

The distances between shafts 7 and 20, between shafts 11 and 18 and between shafts 22 and 24 are equal to one another while, on the one hand, the axis drawn through the shafts 7-11-3-24 and 20-18-22 and, on the other hand, the axis drawn through shafts 7-20, 11-18 and 24-22, are respectively parallel to each other in order that a pure parallelogram system is obtained which, in this case, is only used as positioning means for the lever mechanism.

Arms 9 and 10 are sprung with respect to the frame 26 by a suspension construction with a built in shock absorber 27.

According to the embodiment as shown in FIGS. 2 and 3, whenever the driven wheel 2 encounters irregularities, latter will move up and down and attempting to rock around shaft 7. In this case the tension on the chain 5 remains virtually constant due to the presence of, among others, the levers 13 and 15, with the aim to maintain the distance between shafts 3 and 7 constant or virtually constant.

Indeed, the levers 13 and 15 are ensuring that, as shown in FIG. 10, the shaft 11 virtually describes a circular track with shaft 7 as centrepoint.

FIGS. 4 through 9 inclusive show a more practical embodiment of a wheel suspension according to the invention. In this case all parts can be found as described in FIG. 2, in which the levers 13 and 15 are, in this case, integrated in two cylindrical discs, respectively 28 and 29.

Disc 29, according to the invention, is supported by bearings to allow free rotating movement in an extension of crankcase 8, while disc 28 is supported by bearings, in an eccentric manner, to allow free rotating movement, in disc 29.

The eccentricity E of disc 28 with respect to disc 29 is equal, to the length E1 of lever 15. In disc 28, shaft 11 of the rocking arms 9-10 is mounted, which arms are mounted freely rotating onto shaft 11, in which this shaft 11 is placed eccentrically in disc 28 with an eccentricity E2 which is equal to length E3 of aforementioned lever 13.

As shown in the drawings, in order to ensure maximum stability, two discs 28 and two discs 29 are provided for.

It is evident that in this embodiment, and as better shown still in FIG. 11, while the levers 9-10 rock a rotation of discs 28 in the respective discs 29 is obtained which themselves are provided in a rotating manner in crankcase 8, in such way that shaft 11 moves back and forth in a virtually circular track the centrepoint of which coincides with the axis of shaft 7.

It is noted that, according to the invention, a construction or mechanism is obtained in which the rocking arms (9-10) absorb all forces, while the rods (17-19-23) virtually do not absorb any forces, but only serve as positioning means and can consequently be kept rather light.

It is evident that, in this manner, a wheel suspension, for instance, for a motorcycle is achieved which excludes a tensioning device and which, not only, is very simple in construction, but can as well be realized with a minimum number of parts which are only intended to control movement, but do hardly transfer any forces in such way that the mass thereof can remain quite small and that the inertia of the suspension device is not being adversely affected. Moreover, the various pivoting points, the present mutual rotations of the discs 28 and 29 can be sealed in a very elementary manner, in other words be protected agains water, mud, dust and similar, in which their wear and tear can be limited to a minimum.

FIGS. 12 and 13 show another embodiment in which means are provided which allow for synchronizing discs 28 with respect to discs 29.

For this purpose, discs 28 are mutually connected by a connection piece 30.

Latter shows a passage 31 for the rod 17 which is mounted, freely rotating, on shaft 11. Part 30 is, in this case, provided with protuberances 32-33 between which, by means of spindles 34-35, a tubular guide 36 for the guide rod 37 is hinged. This rod 37 is mounted in the housing 8.

This arrangement allows for both discs 28 and both discs 29 to always move jointly.

It is clear that aforementioned arrangement is not limitative and that it can be replaced by other embodiments which provide for the same result.

Discs 29 are linked to one another by means of a rod or bracket 38 in order to always make these discs 29 move jointly. Other variants are also possible. In this way the location of rods 17 and 23 can be different of that represented in the examples; more or less rods than rods 17 and 23 can be applied; the extremity of rod 19 can be connected to the frame 26 in lieu of crank-case 8; rod 19 can be located, in lieu of above the rocking arms 9-10, next to or underneath these rocking arms 9-10 or be integrated in the rocking arm 9-10; rod 19 can be located as well outside of as in the crankcase; etc.

Present invention is obviously in no way restricted to the embodiments described as examples and shown in the enclosed drawings.

I claim:

1. A wheel suspension for suspending a wheel relative to a vehicle part and driven by an endless transmission, comprising:

an endless element and two rotating elements supporting the endless element, a first of the rotating elements being rotatable with respect to the vehicle part around a first axis, a second of the rotating elements being rotatable around a second axis;

the suspension comprising two rocking arms each having first and second ends;

the wheel and the second rotating element of the transmission being rotatably supported between the first ends;

the suspension further comprising two levers rotatably connected to each other, a first of the levers being rotatably connected to the second ends around a rocking axis;

a second of the levers being rotatably connected to the vehicle part, the levers assuring that during rocking of the rocking arms, the rocking axis of the second ends is always located on a theoretical line drawn through the of the first rotating element and the second rotating element of the transmission, the distance between said rotating axes remaining at least approximately constant.

2. The wheel suspension according to claim 1, wherein the two levers rotatably connected to each other are formed by two discs, the disc forming the second lever being rotatably mounted on the vehicle part, the disc forming the first lever being rotatably mounted out of center on the disc forming the second lever while the second ends are rotatably connected out of center to the disc forming the first lever.

3. The wheel suspension according to claim 1, wherein the first lever is formed by a first set of two discs connected by a connection piece and the second lever is formed by a second set of two discs connected by a connection piece.

4. The wheel suspension according to claim 1, wherein the vehicle part comprises a crankcase and the vehicle part to which said second lever is rotatably connected is the crankcase.

5. The wheel suspension according to claim 1, wherein at least one of said rocking arms forms part of a parallelogram system, the parallelogram system further comprising a rod parallel to the rocking arm and a first connection rod and a second connection rod parallel to each other, the first connection rod being hinged freely to the first end of the rocking arm and to the rod parallel to the rocking arm, the second connection rod being hinged freely to the second end of the rocking arm and to the rod parallel to the rocking arem, whereby the rod parallel to the rocking arm is extended in front of the second connection rod and is hingedly connected with a free end to the vehicle part at a distance from the axis of the first rotating element, which is equal to the distance between the hinged connections of the connection rods to the rocking arm and the rod parallel to the rocking arm.

6. The wheel suspension according to claim 5, wherein the vehicle part comprises a crankcase provided with a support, the free end of the rod parallel to the rocking arm being hingedly connected to the support.

7. The wheel suspension according to claim 5, wherein the vehicle part comprises a frame provided with a support for the rod parallel to the rocking arm and the free end of the rod is hingedly connected to the support.

8. The wheel suspension according to claim 5, wherein the rocking arm is provided at the first end with an extension and, the first connection rod is hingedly connected to the extension.

9. The wheel suspension according to claim 5, wherein the rod parallel to the rocking arm of the parallelogram system is located above the rocking arm.

10. The wheel suspension according to claim 5, wherein the rod parallel to the rocking arm of the parallelogram system is located underneath the rocking arm.

11. The wheel suspension according to claim 5, wherein the rod parallel to the rocking arm of the parallelogram system is located next to the rocking arm.

12. The wheel suspension according to claim 5, wherein the rod parallel to the rocking arm is integrated in the rocking arm.

* * * * *